D. C. JACKSON.
ELECTRIC METER.
APPLICATION FILED SEPT. 14, 1904.

928,521. Patented July 20, 1909.

Witnesses:
Leonard W. Novander.
Charles J. Schmidt.

Inventor
Dugald C. Jackson
By Charles A. Brown
Attorney

UNITED STATES PATENT OFFICE.

DUGALD C. JACKSON, OF MADISON, WISCONSIN, ASSIGNOR TO DUGALD C. JACKSON AND WILLIAM B. JACKSON, A COPARTNERSHIP, OF MADISON, WISCONSIN.

ELECTRIC METER.

No. 928,521.   Specification of Letters Patent.   Patented July 20, 1909.

Application filed September 14, 1904. Serial No. 224,370.

*To all whom it may concern:*

Be it known that I, DUGALD C. JACKSON, citizen of the United States, residing at Madison, in the county of Dane and State of Wisconsin, have invented a certain new and useful Improvement in Electric Meters, of which the following is a full, clear, concise, and exact description, reference being had to the accompanying drawings, forming a part of this specification.

My invention relates to integrating electric meters and particularly to mercury meters, its object being to provide improved means for neutralizing the self induction of the pressure coil, so that the meter may be used successfully as a wattmeter in connection with alternating current circuits.

When the meter is used in connection with an alternating current circuit, I apply means for bringing the magnetism set up by the current which flows in the pressure coil into phase with the pressure across the circuit. This means consists in the employment of a properly adjusted condenser which is connected in parallel with a resistance connected in series with the pressure coil. This condenser must be so adjusted that the current flowing in the pressure coil sets up magnetism which is substantially in phase with the pressure across the circuit for the frequency of the circuit upon which the meter is to be used.

Figure 2:
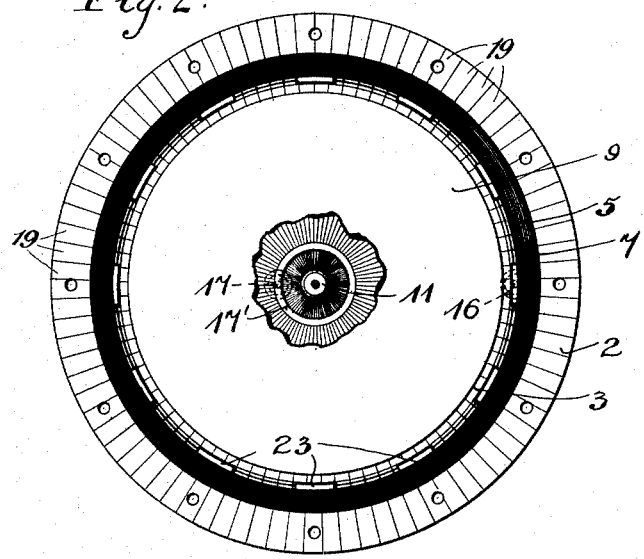
Figure 1:
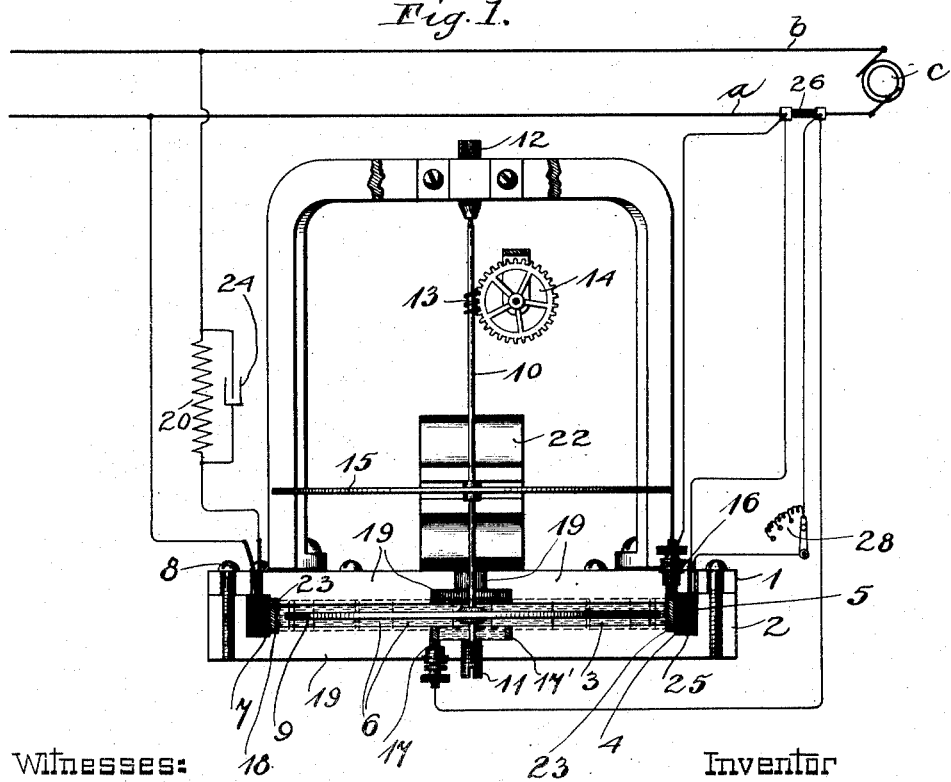

In the accompanying figures which illustrate my invention, Figure 1 is an elevation view of a meter, the mercury containing case being in vertical diametrical section, Fig. 2 is a plan view of the meter, the top half of the containing case and the apparatus carried thereby being removed.

The meter consists of two hollow iron plates 1 and 2, fitting together to form a cylindrical chamber 3. Each of these pieces is slotted to form an annular chamber 4 for receiving the pressure winding 5. The chamber 3 is filled with mercury 6 and a suitable filling 7 is disposed so as to prevent the contact of the mercury with the pressure coil or its escape from the containing chamber. The parts 1 and 2 are connected together by bolts or screws 8, 8. The armature disk 9 is of amalgamated copper mounted on a spindle 10, which spindle is pivoted at its lower end in an adjustable bearing screw 11, (which may carry a suitable jewel) passing through the lower half 2, and the upper half of the spindle engages an adjustable pivot screw 12, a worm 13 on the spindle engaging with gearing mechanism 14 of a recording train in a manner well known in the art. One of the external circuit electrodes 16 may pass through the upper half of the cylinder and be disposed near the periphery of the armature disk where it expands into an amalgamated copper band or contact plates 16' surrounding the periphery of the disk. The other electrode 17 of the external circuit may pass through the lower half 2, its amalgamated end approaching the meter disk near its axis, or it may also terminate in a copper band 17' disposed concentrically about the spindle below the disk. Both electrodes are in contact with the mercury but separated from the iron case, or insulated therefrom, as shown. The ring electrode 16' rests in annular grooves 18 and against the insulating partition, or filling 7 that protects the pressure coil. The mercury is composed of radially disposed laminated strips 19.

The pressure coil 5 surrounding the periphery of the meter disk is connected across the conductors *a* and *b* of the external circuit fed from a source of alternating current *c*. The coil being thus connected, will give the meter the effect of a wattmeter and a high resistance 20 is preferably connected in series therewith. This pressure coil, upon energization, will set up a magnetic field which passes transversely through the mercury chamber and armature disk, and the current of the main circuit will flow from one electrode to the other radially through the disk. The combined effect of this transverse magnetic field and radial current is to set up a rotative torque on the disk which is proportional to the product of pressure and current (watts) in the main circuit. In order that the speed produced by this torque may be proportional to the watts it is necessary to add an appropriate retarding torque. Any form of retarding means following the proper law may be employed for suitably controlling the rotation of the meter disk and I have shown an auxiliary aluminum or copper disk 15 secured to the spindle 10 spanned by a damping magnet 22. When the meter is used for measuring alternating currents, I employ an arrangement for bringing the magnetism set up by the current in the pressure coil into phase with the pressure across the circuit. This I accomplish as shown in Fig. 1, by a suitably proportioned condenser 24 connected in parallel with the resistance 20. As a compensation means for friction losses it is desirable to place a series winding 25 in association with the pressure coil 5, of which the ampere turns bear a ratio to the ampere turns of the pressure coil at any load which is substantially equal to the ratio which the frictional torque bears to the driving torque at that load. This compensating coil may be made of several turns of comparatively fine wire shunted by a substantial shunt 26, included in the main circuit. It is also unnecessary to pass the entire current of the circuit through the armature but the armature circuit may be shunted by a shunt placed in the main circuit. The same shunt may serve for both the armature circuit and the compensating circuit, and therefore, the armature circuit and the winding 25 may be connected as separate branches around the shunt 26. A compensating winding for calibrating purposes and an adjustable resistance 28, as shown, may be connected with the compensating winding 25.

I claim as new and desire to secure by Letters Patent:—

1. In a mercury meter, the combination with a field frame inclosing a cylindrical mercury chamber, of a disk immersed in the mercury of said chamber and adapted to rotate therein, the walls of the field frame opposite said disk being field poles having circular faces disposed substantially over the entire area of the disk, an energizing winding surrounding said field poles and adapted for connection across the limbs of an alternating current circuit to be measured, the metal of said disk being included serially in one limb of the circuit, a resistance in circuit with said energizing winding, and a condenser bridged about said resistance for counteracting the self inductance of said energizing winding and for bringing the magnetism set up by the said energizing coil into phase with the pressure in the main circuit.

2. In a mercury meter, the combination with a field frame, of an armature, an energizing winding for said field frame connected in a derived branch from a main alternating current circuit, a resistance in circuit with said energizing winding, and a condenser bridged about said resistance for causing the magnetism set up by the said energizing winding to be in phase with the pressure in the main circuit.

3. In an electric meter, the combination of an armature, a field frame, a field winding for said field frame, a resistance in the circuit of the field winding, and a condenser bridged about said resistance, said condenser and resistance coöperating to bring the magnetism of the magnetic field into phase with the electro-motive force at the terminals of the field winding upon connection of said winding with an alternating current circuit.

In witness whereof, I hereunto subscribe my name this eighth day of September A. D., 1904.

DUGALD C. JACKSON.

Witnesses:
  PAULINE JAUDA,
  JAMES S. NORRIS.